United States Patent [19]
Snook, Jr.

[11] Patent Number: 4,569,221
[45] Date of Patent: Feb. 11, 1986

[54] PORTABLE ELECTRO-PNEUMATIC CALIBRATOR

[76] Inventor: August M. Snook, Jr., 5924 N. Palm Dr., Baytown, Tex. 77521

[21] Appl. No.: 544,620

[22] Filed: Oct. 24, 1983

[51] Int. Cl.⁴ .......................................... G01N 27/00
[52] U.S. Cl. ................................................ 73/4 R
[58] Field of Search ..................................... 73/4 R

[56]   References Cited

U.S. PATENT DOCUMENTS

| | | | |
|---|---|---|---|
| 3,263,482 | 8/1966 | Shank | 73/4 R |
| 3,355,659 | 5/1964 | Burgess . | |
| 3,440,533 | 4/1969 | Earley . | |
| 3,461,385 | 8/1969 | Bayer . | |
| 3,535,637 | 10/1968 | Goransson . | |
| 3,609,543 | 9/1971 | Whitmore . | |
| 3,777,546 | 12/1973 | Rollins . | |
| 3,876,931 | 4/1975 | Godshalk . | |
| 4,092,865 | 6/1968 | Strybel . | |
| 4,111,058 | 9/1978 | Gross . | |
| 4,125,011 | 11/1978 | Porter . | |
| 4,163,938 | 8/1979 | Moore . | |
| 4,262,248 | 4/1981 | Vincelli . | |
| 4,333,331 | 6/1982 | Mann . | |
| 4,339,943 | 7/1982 | Hedrick . | |
| 4,378,523 | 3/1983 | Norman . | |
| 4,380,166 | 4/1983 | Crombie . | |

OTHER PUBLICATIONS

Tektronix Oscilloscopes & Associates Instruments, 1970.
Olympic Controls, Inc., Data Sheet on Model OCI--008R Electro-Pneumatic Calibrator.

*Primary Examiner*—S. Clement Swisher
*Attorney, Agent, or Firm*—Pravel, Gambrell, Hewitt & Kimball

[57] ABSTRACT

An electro-pneumatic calibrator to be used in testing and calibration of electro-pneumatic devices having the capability of generating or measuring air pressure in psi, current in milliamps or voltage and measuring air pressure in inches of water or resistance in ohms. A plurality of separate digital meters allow simultaneous use of the separate functions. The apparatus includes a switch and two potentiometers which allows setting variable zero points and spans when the apparatus is used to generate a current or voltage and quickly switching between the set zero point and span.

15 Claims, 3 Drawing Figures

PORTABLE ELECTRO-PNEUMATIC CALIBRATOR

FIELD OF THE INVENTION

The present invention relates to a portable device to test and calibrate electro-pneumatic instruments.

DESCRIPTION OF THE PRIOR ART

In the calibration and testing of pipeline flow measuring devices complete and accurate evaluations have been difficult to obtain due to the remote locations of the devices to be tested and the skill and knowledge required to properly use the necessary test equipment. In the prior art, proper testing of a electro-pneumatic flow measuring device required numerous pieces of equipment such as manometers, a variable voltage source, a voltage and a current measuring device and others. Such equipment was made necessary by the variety of electrical and pneumatic signals generated in the normal operation of an electro-pneumatic measuring device. A single piece of equipment which could both measure and generate this variety of signals would be of significant utility.

SUMMARY OF THE INVENTION

The present invention relates to a new and improved electro-pneumatic calibrator in which a single portable unit provides a variety of input and output signals both electrical and pneumatic and displays values for the electrical or pneumatic signals on multiple meters.

It is an object of the present invention to provide an electro-pneumatic calibrator in a single portable unit which provides for the generation and measurement of the electrical and pneumatic signals necessary to test or calibrate electro-pneumatic instruments.

It is a further object of this invention to provide an electro-pneumatic calibrator which includes a circuit to quickly adjust the zero and span output and quickly alternate between the zero and span output of an electrical signal in testing or calibrating electrical instruments.

The unit comprises a housing with a face plate having means to supply or receive electrical or pneumatic signals, meters to display the measured value of the signals and means to adjust the value of the generated signals. The face plate of the unit includes three meters, one reading air pressure in pounds per square inch, one reading air pressure in inches of water and one reading electrical signals of current in milliamps, voltage in direct current or resistance in ohms.

The first meter reads air pressure in pounds per square inch and is activated by a precision pressure transducer that converts air pressure into an electrical signal to operate the meter. The transducer is connected to a circuit including ports on the face plate of the unit. One port is an air pressure inlet for a supply of clean dry compressed air and one is an input/output port. The circuit of the first meter further includes and on-off valve between the supply inlet port and the outlet port and a precision pressure regulator between the supply inlet port and the input/output port. The circuit allows the measurement of an unknown pressure or the output of a regulated pressure at a single port on the face plate.

The second meter reads air pressure as measured in inches of water and is driven by a precision pressure transducer that converts air pressure to an electrical signal to operate the meter. The transducer is connected to a circuit including two ports on the face plate, one a supply air pressure inlet port, in common with the first pressure circuit, a precision pressure regulator, a valve and an outlet port. The valve allows the output through the port of a regulated air pressure of a value as displayed on the meter or venting of the regulated air pressure flow to the atmosphere.

The third meter reads an electrical signal measurement either from one to five volts DC, from four to twenty milliamps or resistance in ohms. The meter is in a circuit including the calibration units power source, jacks on the face plate to connect input/output leads and resistors and potentiometers. A multipositioned selector switch on the face plate connect the input/output jacks, power source, potentiometers and resistors to the meter in a number of circuits to allow the output of a regulated current or voltages or the measurement of unknown current, voltage or resistance. Two positions of the selector switch comprise a circuit that includes a double pole double throw switch and two potentiometers to allow alternating an electrical output at the input/output jacks between a variable zero and a variable span, one position calibrated in volts DC and the second calibrated in milliamps.

DESCRIPTION OF THE PREFERRED EMBODIMENT

Figure 1:
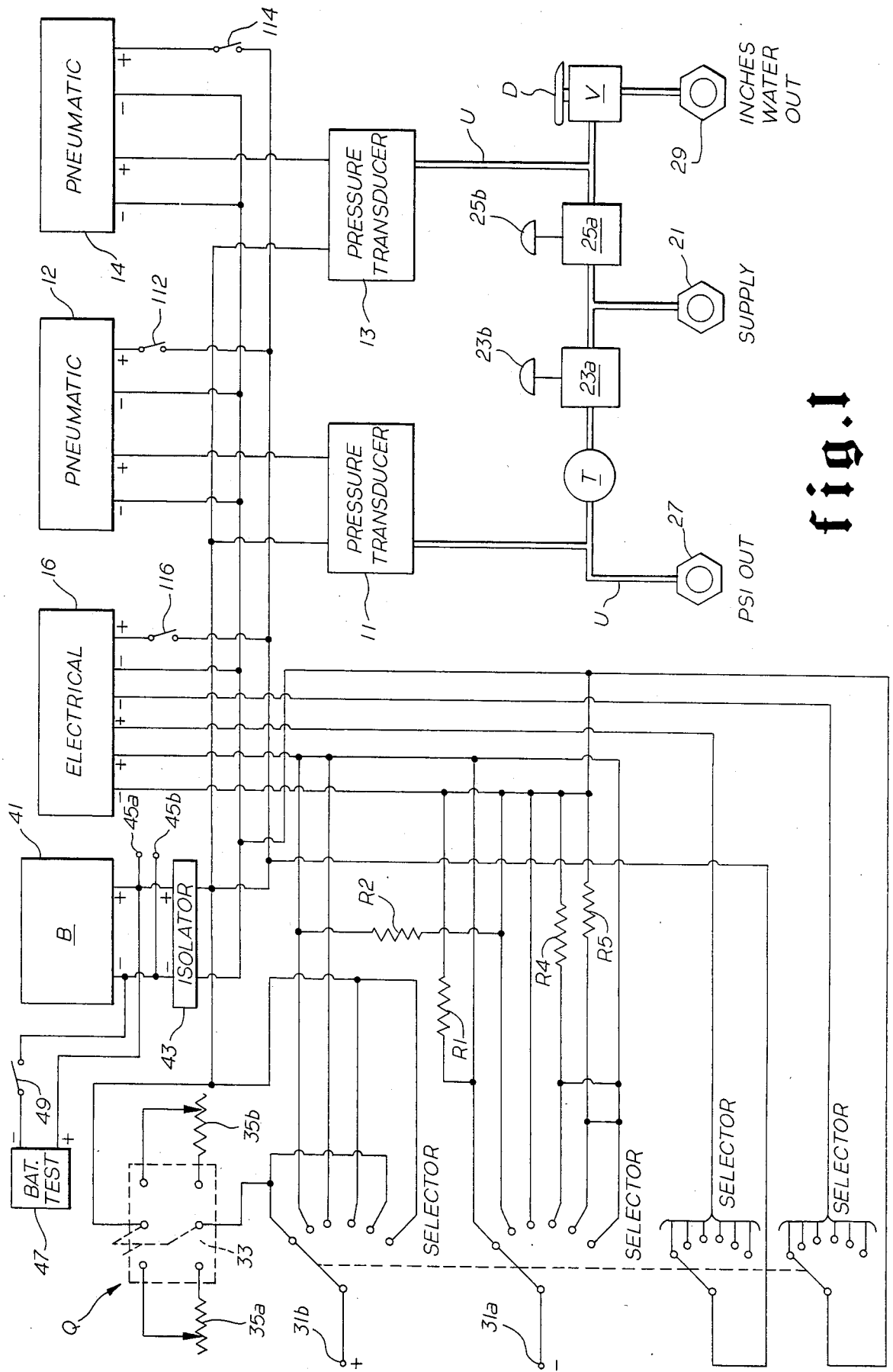
FIG. 1 is a functional schematic of the calibration unit of the present invention.
Figure 2:
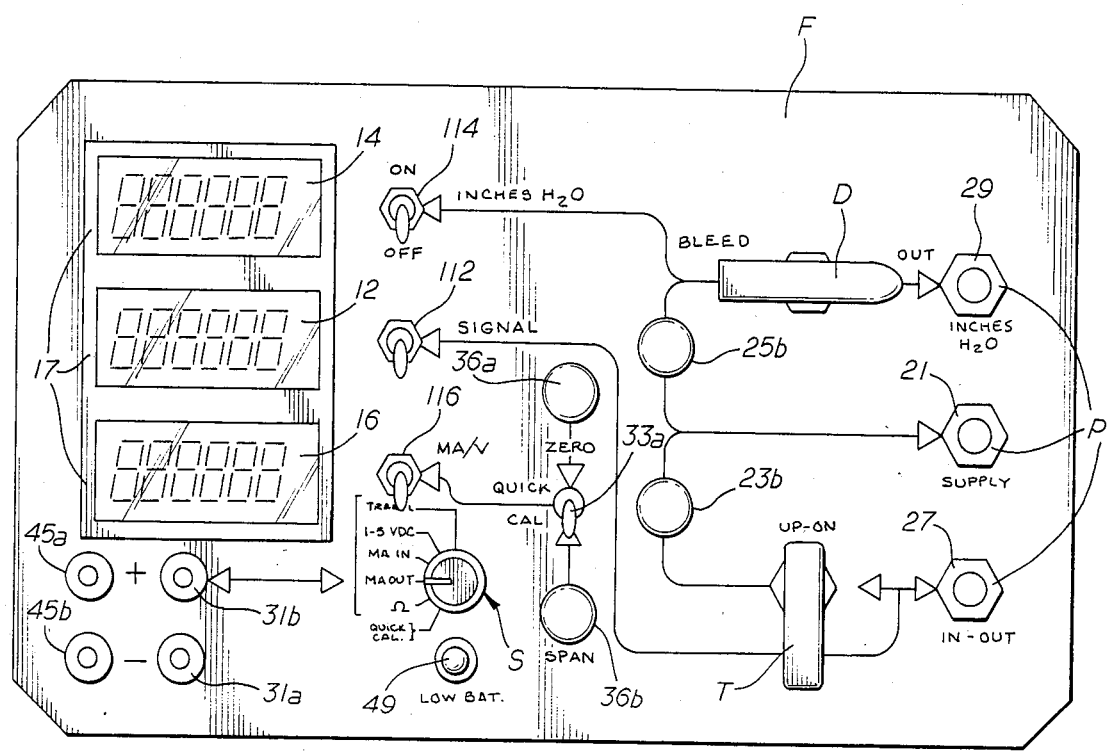
FIG. 2 is a plan view of the face plate of the present invention.
Figure 3:
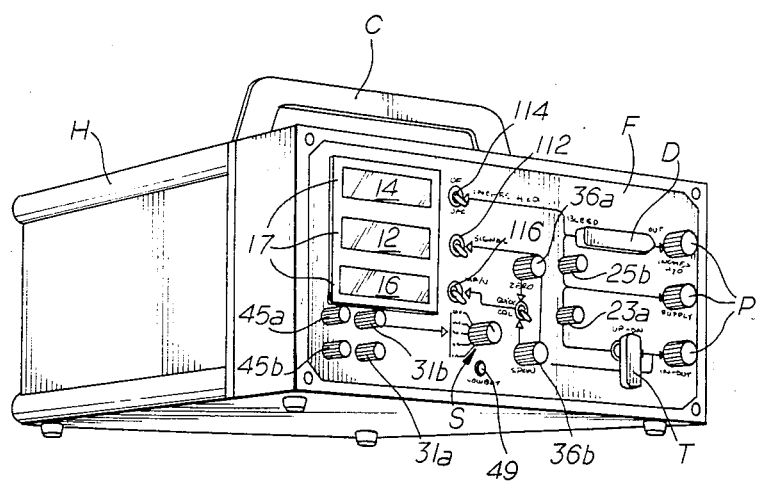
FIG. 3 is a perspective view of the calibration unit of the present invention.

The apparatus A consists of a housing H of generally box shape having a face plate F and a handle C. The face plate F has mounted thereon three digital meters M, electrical jacks J, air pressure ports P, a selector switch S and other knobs and switches as will be more fully described hereinafter.

Enclosed by housing H are a unit power supply B and electrial and pneumatic means which allow the complete testing and calibration of electro-pneumatic devices through the use of the single portable apparatus A controlled and monitored by the meters M and control means on face plate F.

Air pressure ports P are quick connect pressurized air connections as are well known in the art. Supply port 21 is connected to a source (not shown) of clean dry air at a pressure of up to 120 pounds per square inch. Air from supply port 21 is directed within housing H by suitable tubing U to pressure regulators 23a and 25a. Pressure regulators 23a and 25a are precision air pressure regulators of a type as would be well known in the art. The pressure regulators 23a and 25a are adjusted by knobs 23b and 25b respectively on face plate F of the apparatus A to regulate the air pressure from supply port 21.

From pressure regulator 23a compressed air at a regulated pressure flows through suitable tubing U to an on-off toggle switch T on face plate F. Toggle switch T is connected to an input/output port 27 on face plate F and to a pressure transducer 11. Pressure transducer 11 is a precision pressure transducer which converts air pressure into an electrical signal to be displayed as a digital readout on meter 12. Toggle switch T in the on position allows air pressure from port 21 regulated by pressure regulator 23a to flow out port 27 while simultaneously activating pressure transducer 11 so that the pressure of the air supplied at port 27 is displayed on meter 12 on face plate F. When toggle switch T is in the off position port 27 acts as an inlet port so that an unknown air pressure may be measured by pressure transducer 11 and the value displayed on meter 12 in pounds per square inch. Meter 12 is connected to the calibration unit power supply B which consists of a battery by a suitable switch 112. Switch 112 allows power from power supply B to meter 12 to be interrupted when meter 12 is not in use.

Pressure regulator 25a receives clean dry compressed air from port 21 through suitable tubing within housing H. Pressure regulator 25a is connected by suitable tubing to a pressure transducer 13 and valve V. Pressure transducer 13 is a precision pressure transducer which converts air pressure into an electrical signal to be displayed as a digital readout on meter 14 on face plate F. Meter 14 is calibrated in inches of water. Valve V is a two position valve, controlled by handle D on face plate F, which allows air pressure as measured by transducer 13 to be directed to outlet port 29 in a first position or vented to the atmosphere in a second position. This allows port 29 to act alternately as a source of regulated air pressure measured in inches of water or a zero (atmospheric) pressure source by rotation of handle D on face plate F. Meter 14 is connected to power supply B by suitable wiring and a switch 114. Switch 114 allows power to meter 14 to be disconnected when meter 14 is not in use.

Selector switch S on face plate F is a four pole six position switch to interconnect input/output jacks 31a and 31b on face plate F, power supply B and meter 16 in six different circuits as will be more fully described hereinafter. Input/output jacks 31a and 31b are jacks to receive banana plugs to connect electrical test leads (not shown), to the calibration unit in a manner well known in the art.

Position one of selector switch S is a circuit which supplies a variable current in milliamps to the input/output jacks 31a and 31b. The circuit of position one includes power supply B, a resistor R1, meter 16 and quick-cal circuit Q. Quick-cal circuit Q comprises a double pole double throw switch 33 whose position is controlled by toggle handle 33a on face plate F. Switch 33 selectively places one of two potentiometers 35a or 35b in the circuit of selector switch S position one. When potentiometer 35a is in the circuit of position one, an adjustable "zero point" current is supplied to input/output jacks 31a and 31b, when potentiometer 35b is placed in the circuit of position one by throwing double pole double throw switch 33 an adjustable "span" current is supplied to input/output jacks 31a and 31b. Potentiometers 35a and 35b are adjusted by knobs 36a and 36b on face plate F. Thus in selector switch S, position one jacks 31a and 31b can be used as a current source which can be quickly varied from a set zero to a set span by throwing double pole double throw switch 33.

Position two of selector switch S is a circuit to measure current in milliamps at jacks 31a and 31b. The circuit includes jacks 31a and 31b connected to opposite sides of resistor R2 with meter 16 connected across resistor R2 so that meter 16 will display the current flowing from jack 31a to jack 31b in milliamps.

Position three of selector switch S is a circuit to measure voltage across jacks 31a and 31b. The circuit includes jacks 31a and 31b connected across meter 16 so that meter 16 measures the voltage across jacks 31a and 31b.

Position four of selector switch S is a circuit to supply a variable current of from four to twenty milliamps to jacks 31a and 31b. The circuit of position four includes the unit power source B, a resistor R4, meter 16 connected across resistor R4 and input/output jacks 31a and 31b. In position four a variable current of from four to twenty milliamps is supplied to jacks 31a and 31b depending upon the circuit to be tested and the value displayed on meter 16 in milliamps.

Position five of selector switch S is a circuit to supply a variable voltage across jacks 31a and 31b. The circuit of position five includes power supply B, meter 16 and quick-cal circuit Q. Quick-cal circuit Q comprises a double pole double throw switch 33 whose position is controlled by toggle handle 33a on face plate F. Switch 33 selectively places one of the two potentiometers 35a or 35b in the circuit of selector switch S position five. When potentiometer 35a is in the circuit a variable "zero point" voltage is supplied across input/output jacks 31a and 31b. When switch 33 is thrown and potentiometer 35b is in the circuit a variable "span" voltage is supplied. Potentiometer 35a and 35b are controlled by knobs 36a and 36b on face plate F respectively. Thus in selector switch position five, jacks 31a and 31b can be used as a voltage source which can be quickly alternated between a variable zero point and a variable span while the voltage being supplied is displayed on meter 16.

Position six of selector switch S is a circuit to measure resistance across jacks 31a and 31b in ohms. The circuit of position six includes unit power supply B, meter 16 in series and input/output jacks 31a and 31b.

Thus selector switch S allows electrical leads (not shown) to connect input/output jacks 31a and 31b to a device to be tested whereby a regulated source of current or voltage may be applied to the device to be tested or an unknown current, voltage or resistance may be measured.

The units power supply B consists of a twelve volt battery 41 connected to the unit by a DC to DC isolating circuit 43 to protect the battery. The power supply includes input jacks 45a and 45b on face plate F. Input jacks 45a and 45b allow an external power source (not shown) to be used to power the unit. The unit's power supply B also includes a circuit 47 to test the battery 41. By pushing button 49 on face plate F, the condition of battery 41 is indicated.

Thus, the apparatus A provides two pneumatic systems and an electrical system each having a separate meter enclosed in a single portable housing such that simultaneous use in the various steps required in calibration and testing of electro-pneumatic devices, as will be more fully described hereinbelow, is possible.

In the use of the calibration unit of this invention it would be carried to a location in a pipeline where a flow measurement device was to be tested. A typical pipeline flow measuring device consists of an orifice within the pipeline, a pressure measurement or comparing device such as a comparative pressure transducer connected to the pipeline across the orifice, and a modem to convert the signal of the pressure transducer into a computer or controller readable signal and a computer or a controller. The calibration unit of the present invention would be used to isolate and test each element of such a device by supplying known signals and simultaneously measuring the response of the element on the multiple meters.

The pipeline pressure transducer could be tested by supplying a regulated pressure to either side of a differential pressure transducer either from port 29 with valve V to flow or from port 27 with toggle switch T in the on position and noting what signal the computer receives. Alternately, port 27 and port 29 could be connected to opposite sides of a comparative pressure transducer to set up a known pressure differential and note the signal received by the computer as well as measuring the signal with leads connected to input/output jacks 31a and 31b with selector switch S in either position two or position three to measure the pipeline differential pressure transducers output in milliamps or volts.

The pipeline unit modem could be checked next by supplying a known current or voltage with leads connected to input/output jacks 31a and 32b and with selector switch S in position four or position five or supplying an alternating zero or span current with selector switch S in position one and noting the computer response. Alternately the output of the modem could be measured by supplying a known pressure differential to differential pipeline transducer with pneumatic ports 27 and 29 and measuring the output of the modem with leads connected to input/output jacks 31a and 31b and selector switch S in position two or three.

Finally, the transmission lines from the modem to the computer or controller could be tested by sending a known signal from input/output jacks 31a and 31b to the transmission line and supplying a current or voltage by placing selector switch S in position four or position three and noting the signal received by the computer. Thus the calibration unit can isolate and test each element of a pipeline flow measuring device simply and efficiently.

Although the invention is described for testing an electro-pneumatic pipeline flow measuring device, the invention is adaptable for use in testing numerous other electro-pneumatic instruments without departing from the spirit and scope of the invention.

It should be understood that the foregoing description and drawings of the invention are not intended to be limiting, but are only exemplary of the inventive features which are defined in the claims.

What is claimed is:

1. A multifunction portable calibration unit for testing electrical or pneumatic meters or gauges comprising in combination:
a housing having a plurality of display devices mounted thereon exteriorally readable by an operator of said calibration unit;
a first pneumatic means for supplying a regulated air pressure from an air pressure source or receiving an unknown pressure, for measuring the regulated pressure or unknown pressure, and for displaying the pressure measurement on a first display device;
a second pneumatic means for supplying a regulated air pressure from said air pressure source, for measuring the regulated pressure, and for displaying the pressure measurement on a second display device and further including means to vent the regulated air pressure in order to supply a known pressure or atmospheric pressure alternately; and
an electrical means for supplying a regulated current or voltage or receiving an unknown current or voltage and displaying the measured current or voltage on a third display device;
said first pneumatic means, said second pneumatic means and said electrical means being housed in said housing and having a common power source.

2. The multifunction portable calibration unit of claim 1 wherein said power source comprises a battery to supply power for said display means and said third electrical means.

3. The calibration unit of claim 2 further including battery test means for determining the condition of said battery.

4. The power source of claim 2, further including jacks to receive power from an external power source and an isolating circuit to prevent damages to said battery when said external power source is used.

5. The calibration unit of claim 1 wherein said first pneumatic means comprises in series:
an inlet port for receiving air pressure from a pressure source;
a precision pressure regulator to control the pressure from said inlet port;
an on-off valve; and
pressure display means in parallel with a pressure input/output port.

6. The pneumatic means of claim 5 wherein said display means comprises:
a precision pressure transducer to convert air pressure into an electrical signal; and
a digital meter calibrated to receive said electrical signal and to display a digital readout of the measured pressure in pounds per square inch.

7. The display means of claim 6 wherein said meter further includes an on-off switch for said digital meter between said meter and the meter power source.

8. The multifunction calibration unit of claim 1 wherein said second pneumatic means comprises:
an inlet port for receiving air pressure from a pressure source;
a precision pressure regulator to control the pressure from said inlet port; and
in parallel, a pressure display means and a valve to vent the regulated air pressure or direct the regulated air pressure to an outlet port.

9. The second pneumatic means of claim 8 wherein said display means comprises:
a precision pressure transducer for converting air pressure into an electrical signal; and
a digital meter calibrated to receive said electrical signal and display a digital readout of the measured pressure in inches of water.

10. The display means of claim 9 wherein said meter further includes an on-off switch for said digital meter between said meter and the meter power source.

11. The multifunction calibration unit of claim 1 wherein said electrical means comprises:
input/output means for receiving electrical leads to be connected to a device to be tested;
a display means to display the current or voltage measured at the input/output means;
a power supply which may be selectively connected to said input/output means; and
switch means interconnecting said input/output means, said display means and said power supply to allow said input/output means to act as a source of current or voltage or to measure currents or voltage.

12. The electrical means of claim 11 wherein said switch means comprises a four pole six position switch, wherein:

a first position comprises a circuit to supply a current including said display means, said power source, said input/output means, a resistor, and means to adjust a zero point and a span of said current in order to alternately supply a known zero or span current to said input/output means;

a second position comprises a circuit to measure current including said input/output means, said display means and a resistor to measure the current flowing to the input/output means;

a third position comprising a circuit to measure voltage including said input/output means, and said display means in order to measure the voltage across said input/output means;

a fourth position comprising a circuit to supply a variable current including said input/output means, said power source, a resistor, and said display means in order to provide a variable current at said input/output means;

a fifth position comprising a circuit to supply a voltage including said input/output means, said power source, a resistor, said display means and means to adjust a zero point and a span of said voltage in order to alternately supply a known zero or span voltage in order to supply a variable voltage at said input/output means; and a sixth position comprising a circuit including said input/output means, said power source, and said display means to allow said input/output means to measure resistance.

13. The electrical means of claim 11 wherein said input/output means comprises jacks for receiving plugs on electrical leads.

14. The electrical means of claim 11 wherein said display means comprises a digital meter calibrated to receive an electrical signal and display the value of the signal being supplied in volts, amps or ohms.

15. The display means of claim 14 wherein said meter further includes an on-off switch for said digital meter between said meter and the meter power source.

* * * * *